(12) United States Patent
Tang

(10) Patent No.: US 11,446,973 B1
(45) Date of Patent: Sep. 20, 2022

(54) TOWING DEVICE WITH DAMPING FUNCTION

(71) Applicant: Aiming Tang, Jinhua (CN)

(72) Inventor: Aiming Tang, Jinhua (CN)

( * ) Notice: Subject to any disclaimer, the term of this patent is extended or adjusted under 35 U.S.C. 154(b) by 0 days.

(21) Appl. No.: 17/751,683

(22) Filed: May 24, 2022

(30) Foreign Application Priority Data

Mar. 8, 2022 (CN) .......................... 202220488907.7

(51) Int. Cl.
B60D 1/24 (2006.01)
B60D 1/46 (2006.01)
B60D 1/52 (2006.01)
B60D 1/06 (2006.01)

(52) U.S. Cl.
CPC ............. B60D 1/249 (2013.01); B60D 1/46 (2013.01); B60D 1/52 (2013.01); B60D 1/06 (2013.01)

(58) Field of Classification Search
CPC .................................. B60D 1/249; B60D 1/46
See application file for complete search history.

(56) References Cited

U.S. PATENT DOCUMENTS

| | | | |
|---|---|---|---|
| 7,377,536 B2* | 5/2008 | Rehme | B60D 1/065 280/483 |
| 2004/0075244 A1 | 4/2004 | Reutlinger et al. | |
| 2006/0006625 A1 | 1/2006 | Cunningham | |
| 2007/0262560 A1* | 11/2007 | Rehme | B60D 1/065 280/483 |
| 2008/0164678 A1* | 7/2008 | White | B60D 1/52 280/504 |
| 2008/0196651 A1 | 8/2008 | Nigel | |
| 2020/0031185 A1* | 1/2020 | Singh | B60D 1/241 |
| 2020/0047572 A1* | 2/2020 | Fisher | B60D 1/50 |
| 2021/0237524 A1* | 8/2021 | Singh | B60D 1/06 |
| 2022/0088981 A1* | 3/2022 | Fisher | B60D 1/06 |

* cited by examiner

*Primary Examiner* — Kevin Hurley
(74) *Attorney, Agent, or Firm* — Rumit Ranjit Kanakia

(57) ABSTRACT

The present disclosure belongs to a towing device with a damping function. The towing device includes a towing main body and a towing assembly mounted on the towing main body; the towing main body includes a towing cantilever and a vertical adjustment arm arranged at an end part of the towing cantilever; one end of the towing cantilever is connected to the vertical adjustment arm, and the other end is provided with several fixing holes; the towing cantilever is fixed, through fixing pins, on a fixed seat pre-arranged at a rear end of a towing vehicle; a cushion is sleeved on the towing cantilever. The cushion fills a gap between the tightening screw and the fixed seat, and an activity space where the fixing pins are threaded into the fixing holes is also greatly narrowed; the axial movement of the towing cantilever after the mounting is restrained.

10 Claims, 8 Drawing Sheets

TOWING DEVICE WITH DAMPING FUNCTION

TECHNICAL FIELD

The present disclosure belongs to the technical field of vehicle traction, in particular to a towing device with a damping function.

BACKGROUND ART

At present, there are more and more towing devices in daily life, which are used in more and more extensive scenarios. For example, during the use, a vehicle may possibly break down and need a rescue by a trailer. There are also some vehicles such as recreational vehicles, motorcycles, and speedboats, which require towing in transferring and moving processes. Therefore, in order to facilitate the towing, a tow hook assembly will be mounted at a front end of a towed vehicle, and a suitable towing device should be mounted at a rear end of the towing vehicle.

There are various types of towing devices in the prior art, each of which usually includes a towing arm and a towing ball end. The towing arm and the towing ball end are detachably connected by a bolt. There is inevitably a gap between a pin hole and a pin shaft, swaying easily occurs during use. In the towing process, collision continuously occurs, which makes large noise, and even the towing device and a vehicle body are abraded. This is not conductive for smooth towing and safe towing.

SUMMARY

The present disclosure aims to provide a towing device with a damping function, which has a simple structure, a small gap and small noise, is difficult to sway, and achieves smoother and safer towing.

The objective of the present disclosure is achieved below:

A towing device with a damping function includes a towing main body and a towing assembly mounted on the towing main body; the towing main body includes a towing cantilever and a vertical adjustment arm arranged at an end part of the towing cantilever; one end of the towing cantilever is connected to the vertical adjustment arm, and the other end is provided with several fixing holes; the towing cantilever is fixed, through fixing pins, on a fixed seat pre-arranged at a rear end of a towing vehicle; a cushion is sleeved on the towing cantilever; the cushion is located between the fixing holes and the vertical adjustment arm; one side of the cushion close to the vertical adjustment arm is provided with a tightening bolt; and the tightening bolt can be rotated to push the cushion to move towards one side of the fixing holes, so that an end surface of the cushion is abutted against the fixed seat pre-arranged at the rear end of the towing vehicle.

Further, a reinforcement plate is welded between the towing cantilever and the vertical adjustment arm; the reinforcement plate includes a left reinforcement plate and a right reinforcement plate; and the left reinforcement plate and the right reinforcement plate are respectively connected to the towing cantilever and the vertical adjustment arm.

Further, an adjustment plate is erected between the left reinforcement plate and the right reinforcement plate; a threaded hole is formed in the middle of the adjustment plate; a through hole is formed in a position, corresponding to the threaded hole, on the vertical adjustment arm; and the tightening screw passes through the through hole and the threaded hole in sequence via one end of the vertical adjustment arm until an end part of the tightening screw is abutted against the cushion.

Further, a transverse reinforcement plate is arranged between the left reinforcement plate and the right reinforcement plate.

Further, the cushion includes several damping pieces.

Further, the towing assembly includes a mounting seat, and at least one towing member arranged on the mounting seat.

Further, several adjustment holes are longitudinally formed in the vertical adjustment arm; mounting holes matched with the adjustment holes are formed in the mounting seat; the towing assembly is fixed on the vertical adjustment arm through adjustment pins that are threaded into the adjustment holes and the mounting holes; gasket slots are formed in the towing assembly and a contact end surface of the vertical adjustment arm; and a buffer gasket is arranged in the gasket slots.

Further, each fixing pin and/or adjustment pin includes a connecting rod; an anti-falling part is formed at one end of the connecting rod; a diameter of the anti-falling part is greater than that of a hole for mounting adaptation; an anti-falling hole is formed in the other end of the connecting rod; a limiting member is arranged in the anti-falling hole; and the anti-falling part cooperates with the limiting member to prevent the adjustment pin from falling off.

Further, the vertical adjustment arm is U-shaped, which includes a bottom plate connected to the towing cantilever; a left side plate and a right side plate are formed on two sides of the bottom plate; the adjustment holes are correspondingly formed in the left side plate and the right side plate; the bottom plate cooperates with the two side plates to form a mounting slot; the mounting seat is mounted in the mounting slot; and an outer side of the buffer gasket is abutted against the bottom plate.

Further, the mounting seat includes a mounting part and a connecting part; a mounting hole connected to the vertical adjustment arm is formed in the connecting part; several towing members are arranged on a circumferential side of the mounting part; the mounting hole includes a transverse mounting hole and a longitudinal mounting hole which are formed in an intersection manner; the transverse mounting hole horizontally penetrates through left and right ends of the connecting part; and the longitudinal mounting hole vertically penetrates through upper and lower ends of the connecting part.

Compared with the prior art, the present disclosure has outstanding and beneficial technical effects:

The present disclosure includes a towing main body and a towing assembly mounted on the towing main body. The towing main body is used for being connected to the towing vehicle, and the towing assembly is used for being connected to the towed vehicle. Specifically, the towing main body includes the towing cantilever which is transversely disposed and is connected to the towing vehicle; the end part of the towing cantilever is longitudinally provided with the vertical adjustment arm used for mounting the towing assembly; one end of the towing cantilever is connected to the vertical adjustment arm, and the other end is provided with the several fixing holes; and the towing cantilever is fixed on the fixed seat pre-arranged at the rear end of the towing vehicle through the fixing pins. In order to avoid swaying and instability of the towing device due to a gap caused by hole-shaft cooperation, the cushion is sleeved on the towing cantilever; the cushion is located between the fixing holes and the vertical adjustment arm; one side of the cushion close to the vertical adjustment arm is provided with a tightening bolt; and after the towing cantilever is mounted to the fixed seat at the rear end of the towing vehicle through the fixing pins, the tightening bolt is rotated to push the cushion to move towards one side of the fixing holes until an end surface of the cushion is abutted against the fixed seat pre-arranged at the rear end of the towing vehicle. According to the present disclosure, by the arrangement of the cushion, the gap between the tightening screw and the fixed seat is filled, and an activity space where the fixing pins are threaded into the fixing holes is also greatly narrowed; the axial movement of the towing cantilever after the mounting is restrained; the towing main body is steadier and more shock-absorbent during use; the noise generated during towing is reduced; at the same time, repeated collision in the use process caused by a mounting gap is avoided; and the service life of the towing device is prolonged. In addition, the towed vehicle usually has high mass, and a distance between front and rear vehicles is shorter, so that there will be starting, emergency brake, turning, uneven road, and the like in the running process; the inertia and the road conditions will inevitably apply a relatively high impact force to the towing device between the front and rear vehicles; and the cushion can absorb and relieve most of the impact force, so that the towing device is protected, and the towing is safer.

MEANINGS OF REFERENCE NUMERALS IN THE DRAWINGS

Figure 1:
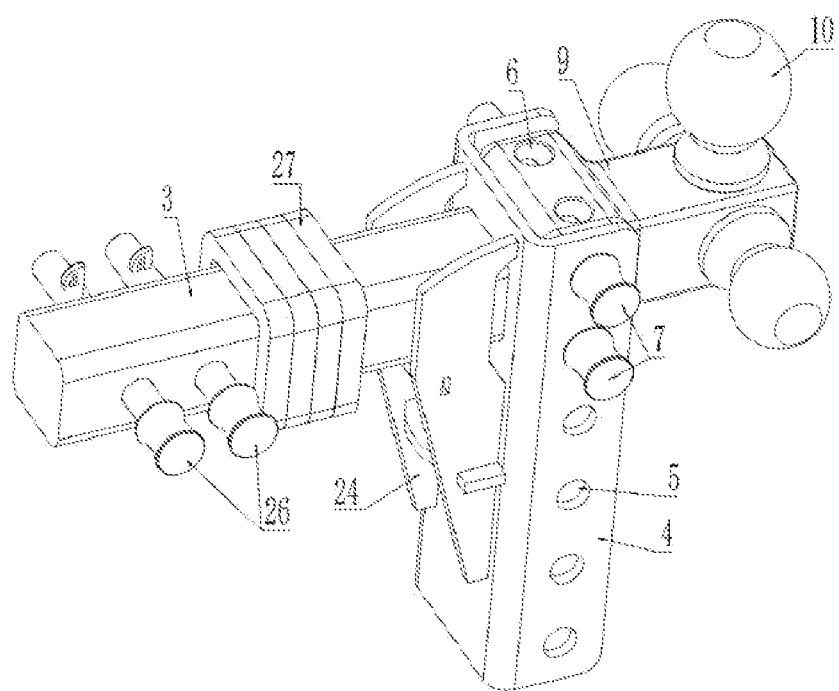
FIG. 1 is a three-dimensional diagram I of the present disclosure.
Figure 2:
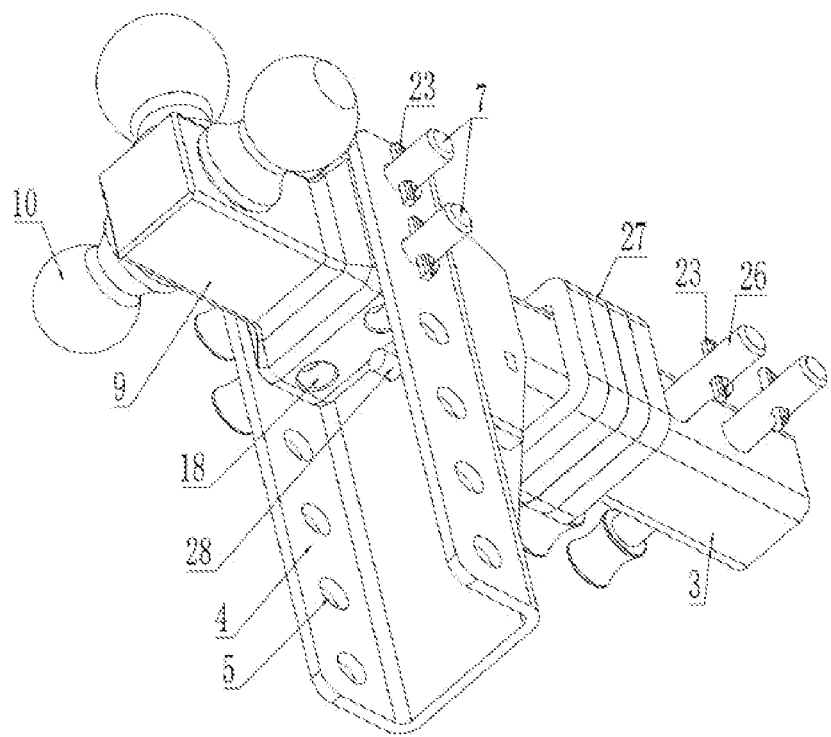
FIG. 2 is a three-dimensional diagram II of the present disclosure.
Figure 3:
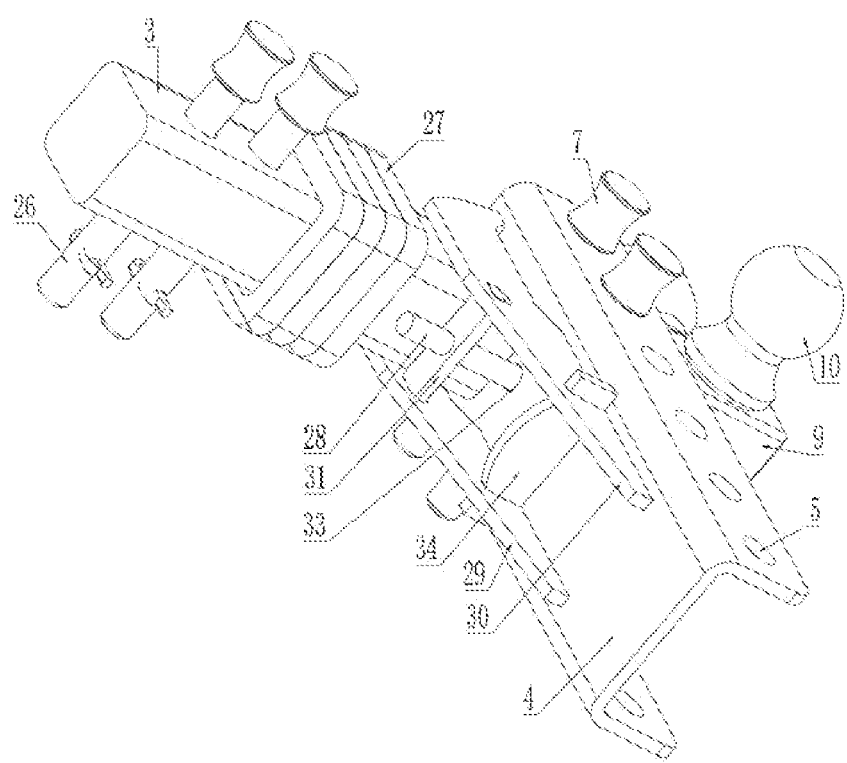
FIG. 3 is a three-dimensional diagram III of the present disclosure.
Figure 4:
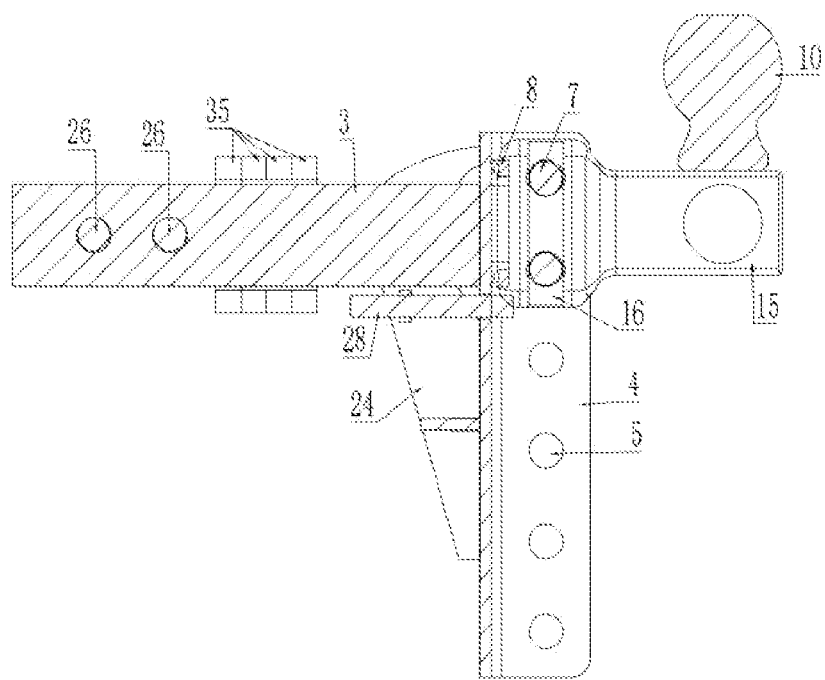
FIG. 4 is a sectional view of the present disclosure.
Figure 5:
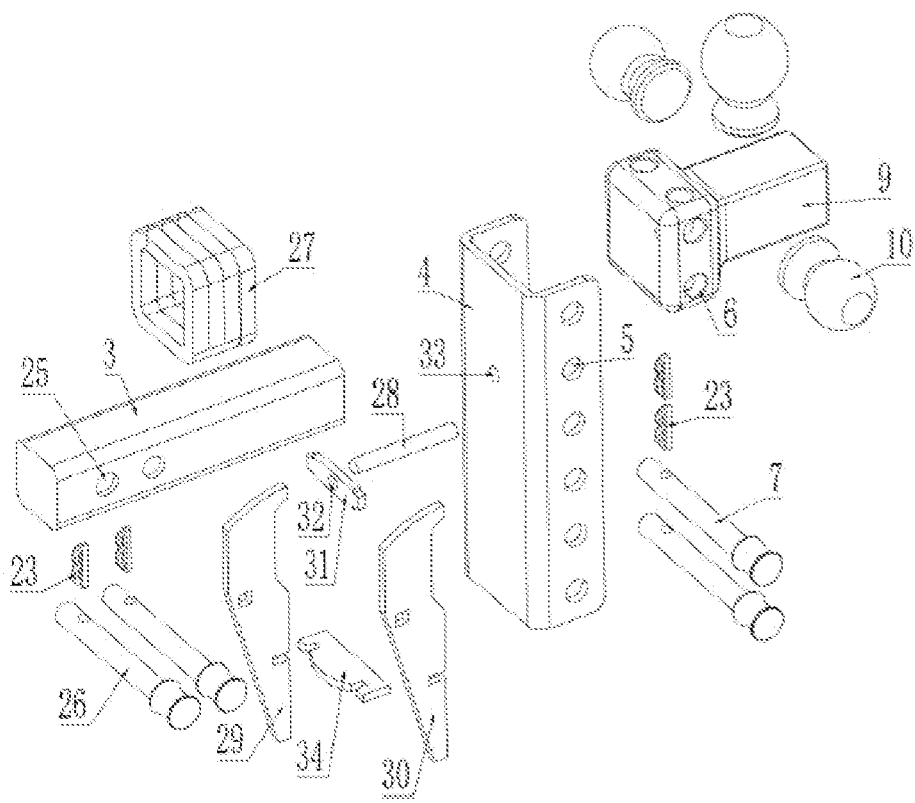
FIG. 5 is an exploded diagram of the present disclosure.
Figure 6:
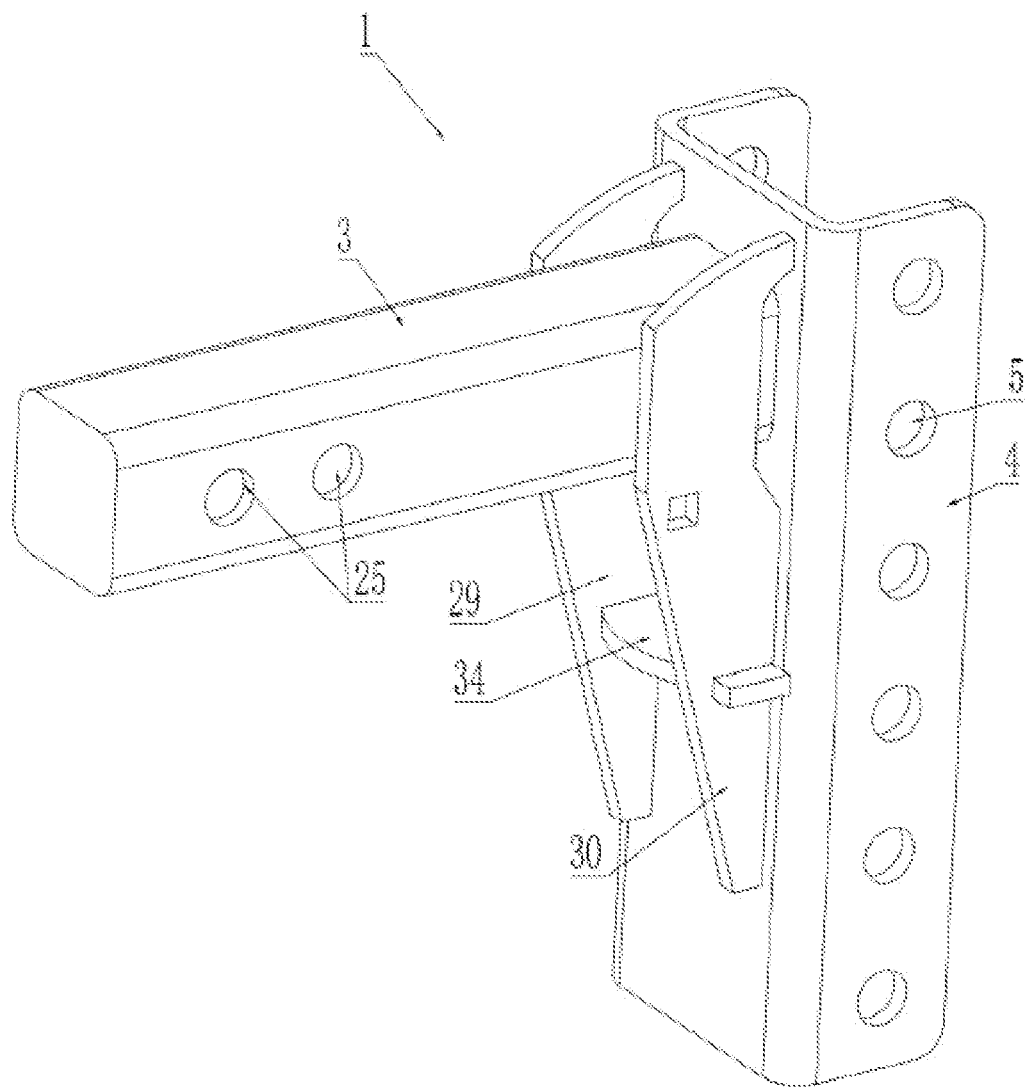
FIG. 6 is a three-dimensional diagram of a towing main body.
Figure 7:
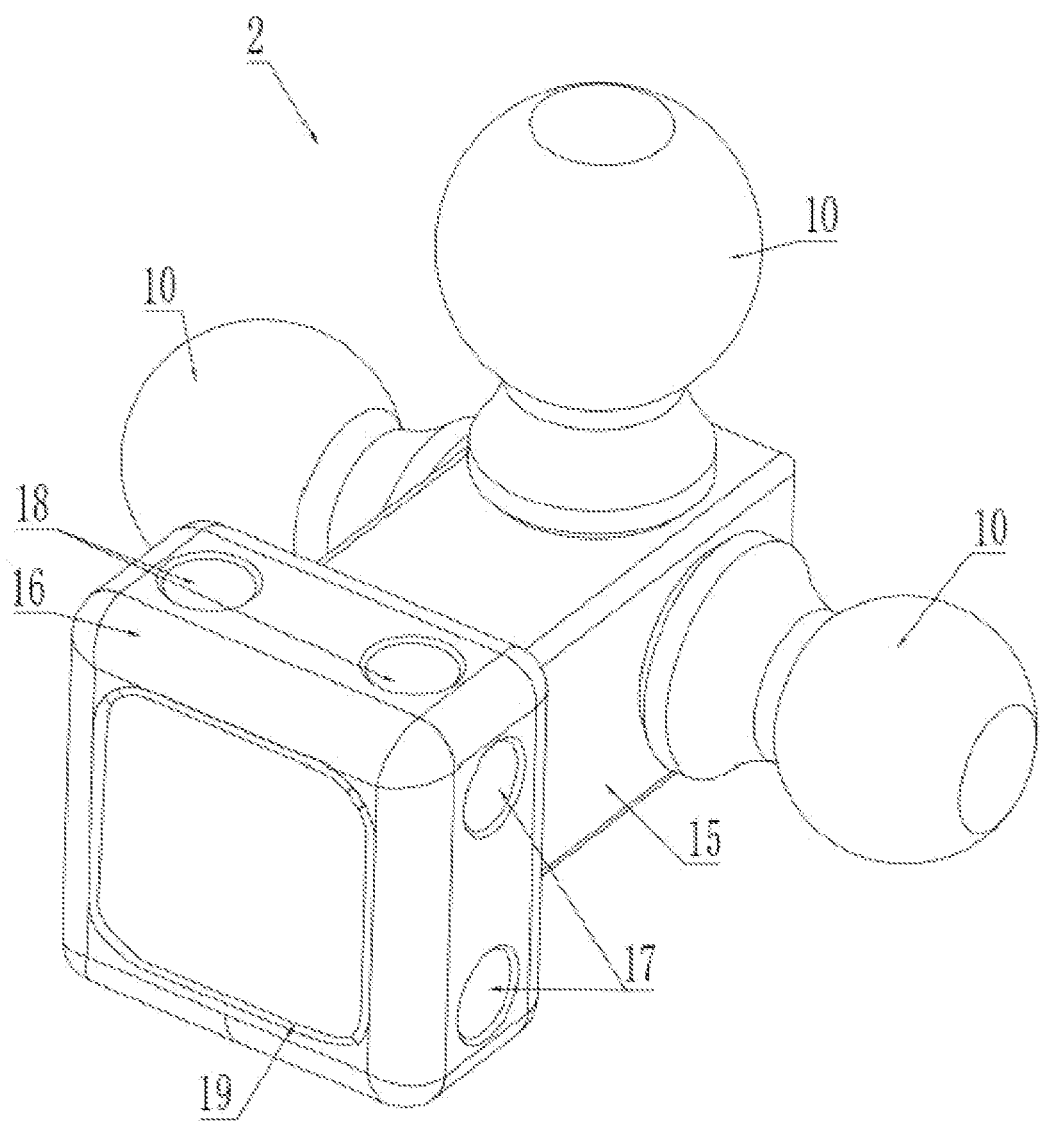
FIG. 7 is a three-dimensional diagram of a towing assembly.
Figure 8:
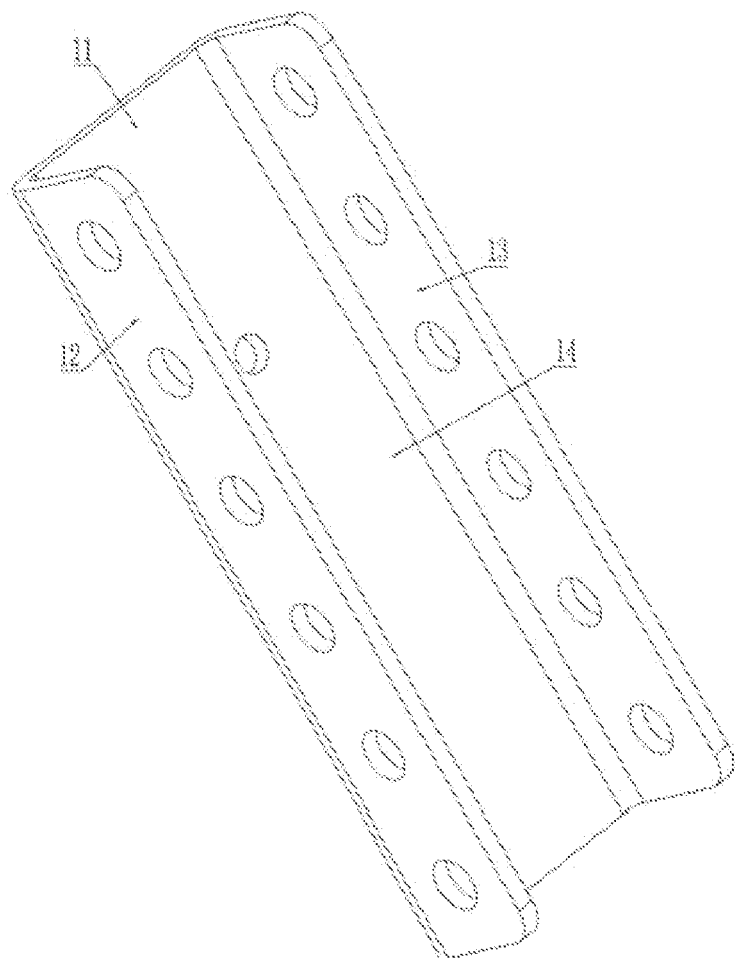
FIG. 8 is a three-dimensional diagram of a vertical adjustment arm.
Figure 9:
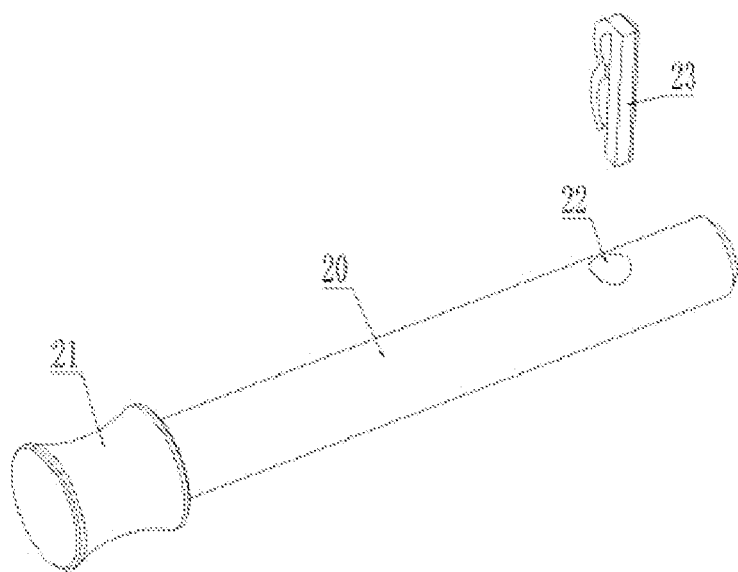
FIG. 9 is a three-dimensional diagram of an adjustment pin.

1: towing main body; 2: towing assembly; 3: towing cantilever; 4: vertical adjustment arm; 5: adjustment hole; 6: mounting hole; 7: adjustment pin; 8: buffer gasket; 9: mounting seat; 10: towing member; 11: bottom plate; 12: left side plate; 13: right side plate; 14: mounting slot; 15: mounting part; 16: connecting part; 17: transverse mounting hole; 18: longitudinal mounting hole; 19: gasket slot; 20: connecting rod; 21: anti-falling part; 22: anti-falling hole; 23: limiting member; 24: reinforcement plate; 25: fixing hole; 26: fixing pin; 27: cushion; 28: tightening screw; 29: left reinforcement plate; 30: right reinforcement plate; 31: adjustment plate; 32: threaded hole; 33: through hole; 34: transverse reinforcement plate; 35: damping piece.

DETAILED DESCRIPTION OF THE EMBODIMENTS

The present disclosure is further described below in combination of specific embodiments.

A towing device with a damping function includes a towing main body 1 and a towing assembly 2 mounted on the towing main body 1; the towing main body 1 includes a towing cantilever 3 and a vertical adjustment arm 4 arranged at an end part of the towing cantilever 3; one end of the towing cantilever 3 is connected to the vertical adjustment arm 4, and the other end is provided with several fixing holes 25; the towing cantilever 3 is fixed, through fixing pins 26, on a fixed seat pre-arranged at a rear end of a towing vehicle; a cushion 27 is sleeved on the towing cantilever 3; the cushion 27 is located between the fixing holes 25 and the vertical adjustment arm 4; one side of the cushion 4 close to the vertical adjustment arm 27 is provided with a tightening bolt 28; and the tightening bolt 28 can be rotated to push the cushion 27 to move towards one side of the fixing holes 25, so that an end surface of the cushion 27 is abutted against the fixed seat pre-arranged at the rear end of the towing vehicle.

The present disclosure includes a towing main body 1 and a towing assembly 2 mounted on the towing main body 1. The towing main body 1 is used for being connected to a towing vehicle, and the towing assembly 2 is used for being connected to a towed vehicle. Specifically, the towing main body 1 includes a towing cantilever 3 which is transversely disposed and is connected to the towing vehicle; an end part of the towing cantilever 3 is longitudinally provided with a vertical adjustment arm 4 used for mounting the towing assembly 2; one end of the towing cantilever 3 is connected to the vertical adjustment arm 4, and the other end is provided with the several fixing holes 25; and the towing cantilever 3 is fixed, through fixing pins 26, on a fixed seat pre-arranged at a rear end of the towing vehicle. In order to avoid swaying and instability of the towing device due to a gap caused by hole-shaft cooperation, a cushion 27 is sleeved on the towing cantilever 3; the cushion 27 is located between the fixing holes 25 and the vertical adjustment arm 4; one side of the cushion 27 close to the vertical adjustment arm 4 is provided with a tightening bolt 28; and after the towing cantilever 3 is mounted to the fixed seat at the rear end of the towing vehicle through the fixing pins 26, the tightening bolt 28 is rotated to push the cushion 27 to move towards one side of the fixing holes 25 until an end surface of the cushion 27 is abutted against the fixed seat pre-arranged at the rear end of the towing vehicle. According to the present disclosure, by the arrangement of the cushion 27, the gap between the tightening screw 28 and the fixed seat is filled, and an activity space where the fixing pins 26 are threaded into the fixing holes 25 is also greatly narrowed; the axial movement of the towing cantilever 3 after the mounting is restrained; the towing main body 1 is steadier and more shock-absorbent during use; the noise generated during towing is reduced; at the same time, repeated collision in the use process caused by a mounting gap is avoided; and the service life of the towing device is prolonged. In addition, the towed vehicle usually has high mass, and a distance between front and rear vehicles is shorter, so that there will be starting, emergency brake, turning, uneven road, and the like in the running process; the inertia and the road conditions will inevitably apply a relatively high impact force to the towing device between the front and rear vehicles; and the cushion 27 can absorb and relieve most of the impact force, so that the towing device is protected, and the towing is safer.

As one preferable implementation, a reinforcement plate 24 is welded between the towing cantilever 3 and the vertical adjustment arm 4; the reinforcement plate 24 includes a left reinforcement plate 29 and a right reinforcement plate 30; and the left reinforcement plate 29 and the right reinforcement plate 30 are respectively connected to and cooperate with the towing cantilever 3 and the vertical adjustment arm 4 to form a stable triangular shape. The reinforcement plate 24 plays a role of connection and supporting, which ensures the connection strength of the towing cantilever 3 and the vertical adjustment arm 4 and shares and balance the stress, so that the structure is firmer and difficult to break.

The present disclosure discloses a method for mounting and adjusting the tightening screw 28. An adjustment plate 31 is erected between the left reinforcement plate 29 and the right reinforcement plate 30; a threaded hole 32 is formed in the middle of the adjustment plate 31; a through hole 33 is formed in a position, corresponding to the threaded hole 32, on the vertical adjustment arm 4; and the tightening screw 28 passes through the through hole 33 and the threaded hole 32 in sequence via one end of the vertical adjustment arm 4 until an end part of the tightening screw 28 is abutted against the cushion 27. When adjustment is required, the tightening screw 28 is rotated from one side of the vertical adjustment arm 4, so as to screw in or screw out the tightening screw 28, which is quite convenient and fast. Of course, a thread is formed in the through hole 33 or the adjustment plate 31 and the vertical adjustment arm 4 are both provided with holes with threads. These are all conventional measures of the present disclosure.

As one preferable implementation, a transverse reinforcement plate 34 is arranged between the left reinforcement plate 29 and the right reinforcement plate 30, which further enhances the connection strength and balance the stress.

As one preferable implementation, the cushion 27 includes several damping pieces 35. The damping pieces 35 can be randomly added and subtracted or replaced according to a use need, so as to overcome a machining error during individual production of different towing devices, to adapt to the size of the fixed seat at the rear end of the towing vehicle, and to cope with the treatment after use, aging and wear.

As one preferable implementation, the towing assembly 2 includes a mounting seat 9, and at least one towing member 10 arranged on the mounting seat 9. Preferably, several towing members 10 are arranged on a circumferential side of the mounting part 9. Each towing member 10 may be a towing ball end, a towing hook, and other towing manners. There may be one, two, three, four, or another number of towing members 10 according to a use need. During towing, towing members 10 with different angles can be selected, or it can also be selected to use a plurality of towing members 10 at the same time.

As one preferable implementation, several adjustment holes 5 are longitudinally formed in the vertical adjustment arm 4. The towing assembly 2 is detachably connected to the vertical adjustment arm 4. The towing assembly 2 can be selectively mounted on the adjustment holes 5 with different heights according to an actual need, so as to meet adaptation requirements of different towing scenarios, thus improving the use convenience. Mounting holes 6 matched with the adjustment holes 5 are formed in the mounting seat 9; the towing assembly 2 is fixed on the vertical adjustment arm 4 through adjustment pins 7 that are threaded into the adjustment holes 5 and the mounting holes 6; gasket slots 19 are formed in the towing assembly 2 and the contact end surface of the vertical adjustment arm 4; and a buffer gasket 8 is arranged in the gasket slots 19, which facilitates installation, removal, and replacement. When the towing device is required to be assembled for use, the mounting holes 6 in the towing assembly 2 and the adjustment holes 5 in the vertical adjustment arm 4 are aligned to a correct mounting position; and the adjustment pins 7 are threaded into the adjustment holes 5 and the mounting holes 6 in sequence, so that the towing assembly 2 is firmly fixed on the vertical adjustment arm 4. In order to avoid the swaying and instability of the towing device due to a gap caused by hole-shaft cooperation, the buffer gasket 8 is arranged to the towing assembly 2 and a contact end surface of the vertical adjustment arm 4; one end of the buffer gasket 8 is abutted against the bottom of the towing assembly 2, and the other end is abutted against the contact end surface of the vertical adjustment arm 4, so that the gap between the towing assembly 2 and the vertical adjustment arm 4 is filled, and the activity space where the fixing pins 7 are threaded into the fixing holes 5 and the mounting holes 6 is also greatly narrowed; the towing assembly 2 is steadier and more shock-absorbent during use; the noise generated during towing is reduced; at the same time, repeated collision in the use process caused by a mounting gap is avoided; and the service life of the towing device is prolonged. In addition, the towed vehicle usually has high mass, and a distance between front and rear vehicles is shorter, so that there will be starting, emergency brake, turning, uneven road, and the like in the running process; the inertia and the road conditions will inevitably apply a relatively high impact force to the towing device between the front and rear vehicles; and the buffer gasket 8 can absorb and relieve most of the impact force, so that the towing device is protected, and the towing is safer.

As mentioned above, the present disclosure discloses a method for achieving dual damping by the cushion 27 and the buffer gasket 8. Damping structures are arranged at a connecting end between the towing device and the towing vehicle as well as a connecting end between the towing device and the towed vehicle, thus overcoming the problem that a gap is most likely to exist and avoiding a connecting part 16 from swaying; the overall damping effect is better; and the use experience is better.

As one preferable implementation, each of each fixing pin 26 and each adjustment pin 7 includes a connecting rod 20. An anti-falling part 21 is formed at one end of the connecting rod 20; a diameter of the anti-falling part 21 is greater than that of a hole for mounting adaptation; an anti-falling hole 22 is formed in the other end of the connecting rod 20; a limiting member 23 is arranged in the anti-falling hole 22; the limiting member 23 may adopt an R-shaped pin; the anti-falling part 21 and the limiting member 23 on the adjustment pin 7 are located on left and right outer sides of the vertical adjustment arm 4; the anti-falling part 21 cooperates with the limiting member 23 to prevent the adjustment pin 7 from falling off; the anti-falling part 21 and the limiting member 23 on the fixing pin 26 are located on left and right outer sides of the fixed seat; and the anti-falling part 21 cooperates with the limiting member 23 to prevent the fixing pin 26 from falling off. According to the present disclosure, the structures of the fixing pins 26 and the adjustment pins 7 can ensure the mounting stability during their connection, and are easy to produce and machine at the same time. The mounting and removal methods are simple and fast; no additional auxiliary tool is needed; and the present disclosure is practical and efficient.

As one preferable implementation, the vertical adjustment arm 4 is U-shaped; the vertical adjustment arm 4 includes a bottom plate 11 connected to the towing cantilever 3; a left side plate 12 and a right side plate 13 are formed on two sides of the bottom plate 11; the adjustment holes 5 are correspondingly formed in the left side plate 12 and the right side plate 13; the bottom plate 11 cooperates with the two side plates to form a mounting slot 14; the mounting seat 9 is mounted in the mounting slot 14, so that the spatial arrangement is reasonable, and the connection is stable; the mounting seat 9 can slide up and down in the mounting slot 14, so as to find an adjustment hole 5 with a proper height; and the buffer gasket 8 is arranged at the bottom of the connecting part 16 on the mounting seat 9, that is, it is abutted against the slot bottom of the mounting slot 14.

As one preferable implementation, the mounting seat 9 includes a mounting part 15 and the connecting part 16; a mounting hole 6 connected to the vertical adjustment arm 4 is formed in the connecting part 16; several towing members 10 are arranged on a circumferential side of the mounting part 15. The towing members have a reasonable structural design and will not interfere with each other to affect the use. Preferably, the connecting part 16 and/or the mounting part 15 is rectangular, so that a contact plane, where the connecting part 16 is mounted, on the vertical adjustment arm 4 is enlarged, and it is convenient to arrange the towing members 10 around the mounting part 15 and to adjust and determine a mounting angle.

In order to reasonable utilize the space of the connecting part 16, the mounting hole 6 includes a transverse mounting hole 17 and a longitudinal mounting hole 18 which are formed in an intersection manner. This structure saves the space, and positions, to which the towing assembly 2 is rotated, of the mounting holes 6 of all the end surfaces are consistent. The gap between the connecting part 16 and the vertical adjustment arm 4 is constant, so that the effect of the buffer gasket 8 is stable; the transverse mounting hole 17 horizontally penetrates through left and right ends of the connecting part 16; and the longitudinal mounting hole 18 vertically penetrates through upper and lower ends of the connecting part 16. According to the present disclosure, the mounting holes 6 are formed in a peripheral side of the connecting part 16, so that the towing assembly 2 can be mounted in different directions. The towing assembly can be fixed on the vertical adjustment arm 4 when rotated to all the end surfaces, so that it is convenient to use the towing members 10 at different positions on the mounting part 15 or adjust the towing member 10 to be used to a proper angle.

Preferably, the transverse mounting hole 17 and the longitudinal mounting hole 18 are each formed in pairs. That is, during mounting, two adjustment pins 7 are used for plugging connection to prevent the towing assembly 2 from rotating around the adjustment pins 7. The upper and lower parallel adjustment pins 7 are stressed more uniformly, thus achieving double insurance, and the towing assembly 2 is mounted more stably and firmly. Of course, the number of the mounting holes 6 in each side can be increased or decreased, and both increase and decrease fall within the protection scope of the present disclosure.

The above embodiments are only preferable embodiments of the present disclosure and do not limit the protection scope of the present disclosure. Therefore, all equivalent changes made in accordance with the structure, shape and principle of the present disclosure shall fall within the protection scope of the present disclosure.

What is claimed is:

1. A towing device with a damping function, comprising a towing main body (1) and a towing assembly (2) mounted on the towing main body (1), wherein the towing main body (1) comprises a towing cantilever (3) and a vertical adjustment arm (4) arranged at an end part of the towing cantilever (3); one end of the towing cantilever (3) is connected to the vertical adjustment arm (4), and the other end is provided with several fixing holes (25); the towing cantilever (3) is fixed, through fixing pins (26), on a fixed seat pre-arranged at a rear end of a towing vehicle; a cushion (27) is sleeved on the towing cantilever (3); the cushion (27) is located between the fixing holes (25) and the vertical adjustment arm (4); one side of the cushion (27) close to the vertical adjustment arm (4) is provided with a tightening bolt (28); and the tightening bolt (28) can be rotated to push the cushion (27) to move towards one side of the fixing holes (25), so that an end surface of the cushion (27) is abutted against the fixed seat pre-arranged at the rear end of the towing vehicle.

2. The towing device with the damping function according to claim 1, wherein a reinforcement plate (24) is welded between the towing cantilever (3) and the vertical adjustment arm (4); the reinforcement plate (24) comprises a left reinforcement plate (29) and a right reinforcement plate (30); and the left reinforcement plate (29) and the right reinforcement plate (30) are respectively connected to the towing cantilever (3) and the vertical adjustment arm (4).

3. The towing device with the damping function according to claim 2, wherein an adjustment plate (31) is erected between the left reinforcement plate (29) and the right reinforcement plate (30); a threaded hole (32) is formed in the middle of the adjustment plate (31); a through hole (33) is formed in a position, corresponding to the threaded hole (32), on the vertical adjustment arm (4); and the tightening screw (28) passes through the through hole (33) and the threaded hole (32) in sequence via one end of the vertical adjustment arm (4) until an end part of the tightening screw (28) is abutted against the cushion (27).

4. The towing device with the damping function according to claim 3, wherein a transverse reinforcement plate (34) is arranged between the left reinforcement plate (29) and the right reinforcement plate (30).

5. The towing device with the damping function according to claim 1, wherein the cushion (27) comprises several damping pieces (35).

6. The towing device with the damping function according to claim 1, wherein the towing assembly (2) comprises a mounting seat (9), and at least one towing member (10) arranged on the mounting seat (9).

7. The towing device with the damping function according to claim 6, wherein several adjustment holes (5) are longitudinally formed in the vertical adjustment arm (4); mounting holes (6) matched with the adjustment holes (5) are formed in the mounting seat (9); the towing assembly (2) is fixed on the vertical adjustment arm (4) through adjustment pins (7) that are threaded into the adjustment holes (5) and the mounting holes (6); gasket slots (19) are formed in the towing assembly (2) and a contact end surface of the vertical adjustment arm (4); and a buffer gasket (8) is arranged in the gasket slots (19).

8. The towing device with the damping function according to claim 7, wherein each of each fixing pin (26) and each adjustment pin (7) comprises a connecting rod (20); an anti-falling part (21) is formed at one end of the connecting rod (20); a diameter of the anti-falling part (21) is greater than that of a hole for mounting adaptation; an anti-falling hole (22) is formed in the other end of the connecting rod (20); a limiting member (23) is arranged in the anti-falling hole (22); and the anti-falling part (21) cooperates with the limiting member (23) to prevent the fixing pin (26) and the adjustment pin (7) from falling off.

9. The towing device with the damping function according to claim 7, wherein the vertical adjustment arm (4) is U-shaped, which includes a bottom plate (11) connected to the towing cantilever (3); a left side plate (12) and a right side plate (13) are formed on two sides of the bottom plate (11); the adjustment holes (5) are correspondingly formed in the left side plate (12) and the right side plate (13); the bottom plate (11) cooperates with the two side plates to form a mounting slot (14); the mounting seat (9) is mounted in the mounting slot (14); and an outer side of the buffer gasket (8) is abutted against the bottom plate (11).

10. The towing device with the damping function according to claim 6, wherein the mounting seat (9) comprises a mounting part (15) and a connecting part (16); a mounting hole (6) connected to the vertical adjustment arm (4) is formed in the connecting part (16); several towing members (10) are arranged on a circumferential side of the mounting part (15); the mounting hole (6) comprises a transverse mounting hole (17) and a longitudinal mounting hole (18) which are formed in an intersection manner; the transverse mounting hole (17) horizontally penetrates through left and right ends of the connecting part (16); and the longitudinal mounting hole (18) vertically penetrates through upper and lower ends of the connecting part (16).

* * * * *